United States Patent
Ginsberg et al.

(10) Patent No.: US 8,862,950 B1
(45) Date of Patent: Oct. 14, 2014

(54) TESTING THE OPERATION OF AN APPLICATION PROGRAMMING INTERFACE

(75) Inventors: Beth H. Ginsberg, Cape Town (ZA); David Brown, Cape Town (ZA); Neil A. Eriksson, Cape Town (ZA); John M. Morkel, Cape Town (ZA); Keegan Carruthers Smith, Cape Town (ZA); Imogen A. Wright, Cape Town (ZA)

(73) Assignee: Amazon Technologies, Inc., Reno, NV (US)

(*) Notice: Subject to any disclaimer, the term of this patent is extended or adjusted under 35 U.S.C. 154(b) by 453 days.

(21) Appl. No.: 13/240,579

(22) Filed: Sep. 22, 2011

(51) Int. Cl.
*G06F 11/00* (2006.01)

(52) U.S. Cl.
USPC .......... 714/57; 714/25; 714/46; 714/48; 717/124; 717/125

(58) Field of Classification Search
USPC ............ 714/25, 46, 48, 57; 717/124, 125
See application file for complete search history.

(56) References Cited

U.S. PATENT DOCUMENTS

| | | | | |
|---|---|---|---|---|
| 7,047,442 B2 * | 5/2006 | Sutton | ............................. | 714/25 |
| 7,089,534 B2 * | 8/2006 | Hartman et al. | ............... | 717/125 |
| 7,203,928 B2 * | 4/2007 | Mandava et al. | .............. | 717/124 |
| 7,287,190 B2 * | 10/2007 | Rosenman et al. | ............. | 714/32 |
| 7,493,597 B2 * | 2/2009 | Hefner | ........................... | 717/124 |
| 7,506,311 B2 * | 3/2009 | Subramanian et al. | ........ | 717/124 |
| 7,886,188 B2 * | 2/2011 | Gorman et al. | ................. | 714/25 |
| 7,895,579 B2 * | 2/2011 | Guerrera et al. | .............. | 717/125 |
| 7,913,230 B2 * | 3/2011 | Vikutan | ......................... | 717/124 |
| 8,166,458 B2 * | 4/2012 | Li et al. | .......................... | 717/124 |
| 8,181,159 B2 * | 5/2012 | Khalil et al. | .................... | 717/124 |
| 8,321,839 B2 * | 11/2012 | Slone et al. | ..................... | 717/124 |
| 8,356,282 B1 * | 1/2013 | Leippe et al. | .................. | 717/125 |
| 8,458,666 B2 * | 6/2013 | Mitra | ............................. | 717/125 |
| 2004/0128652 A1 * | 7/2004 | Mandava et al. | .............. | 717/124 |
| 2004/0205565 A1 * | 10/2004 | Gupta | ............................ | 715/513 |
| 2005/0050391 A1 * | 3/2005 | Grieskamp et al. | .............. | 714/25 |
| 2005/0188262 A1 * | 8/2005 | Rosenman et al. | ............. | 714/25 |
| 2006/0015847 A1 * | 1/2006 | Carroll, Jr. | ..................... | 717/109 |
| 2008/0209275 A1 * | 8/2008 | Kwan et al. | ..................... | 714/38 |
| 2008/0244525 A1 * | 10/2008 | Khalil et al. | .................... | 717/124 |
| 2009/0199160 A1 * | 8/2009 | Vaitheeswaran et al. | ...... | 717/124 |
| 2011/0113405 A1 * | 5/2011 | Guerrera et al. | .............. | 717/125 |
| 2012/0167078 A1 * | 6/2012 | Arscott et al. | ..................... | 718/1 |
| 2012/0204153 A1 * | 8/2012 | Peterson et al. | ............. | 717/124 |
| 2013/0024729 A1 * | 1/2013 | Salloum et al. | ................. | 714/25 |
| 2013/0042222 A1 * | 2/2013 | Maddela | ....................... | 717/124 |

* cited by examiner

*Primary Examiner* — Joshua P Lottich
(74) *Attorney, Agent, or Firm* — Hope Baldauff, LLC

(57) ABSTRACT

An API testing component is provided that is configured to deploy test suites to one or more test virtual machine instances. The test suites include an API test. The API tests are periodically executed on the test virtual machine instances, and test results generated by the API tests are collected and stored. The API testing component also provides a user interface for viewing the test results using a user interface specification that defines a visual layout for presenting test results generated by one or more test suites. The API testing component might also generate one or more alarm messages utilizing the test results and an alarm specification.

20 Claims, 13 Drawing Sheets

__US 8,862,950 B1__

TESTING THE OPERATION OF AN APPLICATION PROGRAMMING INTERFACE

BACKGROUND

A programmable execution service ("PES") can provide computing resources for executing applications on a permanent or an as-needed basis. The computing resources provided by a PES may include various types of resources, such as data processing resources, data storage resources, data communication resources, and the like. Each type of computing resource may be general-purpose or may be available in a number of specific configurations. For example, data processing resources may be available as virtual machine instances ("instances"). The instances may be configured to execute applications, including World Wide Web ("Web") servers, application servers, media servers, database servers, and the like. The resources provided by a PES can typically be purchased and utilized according to various financial models.

A PES might expose an application programming interface ("API") for managing the operation of instances executing within the PES. For instance, an API might be exposed for use by customers of the PES that allows the customers to create, configure, execute, and maintain instances executing on the PES. Other types of APIs might also be provided.

The methods exposed by an API for creating and maintaining instances executing within a PES might be implemented by a large number of inter-dependent components that execute in combination to provide the API. These components might be developed and/or maintained by many different development teams. Components developed and maintained by each development team might have complex dependencies upon components developed and maintained by other teams.

In order to provide optimized service to customers of the PES, it is necessary for each development team to have current information regarding the health and operation of the API components that they are responsible for. To address this, development teams typically develop and maintain their own test mechanisms for testing the API components that they are responsible for. When multiple teams develop their own testing mechanisms, however, there may be significant duplication of effort. Moreover, because test mechanisms developed by different teams are typically incompatible, it may be difficult for a development team to determine the health of dependent API components that are maintained by other development teams.

It is with respect to these and other considerations that the disclosure made herein is presented.

DETAILED DESCRIPTION

Figure 1:
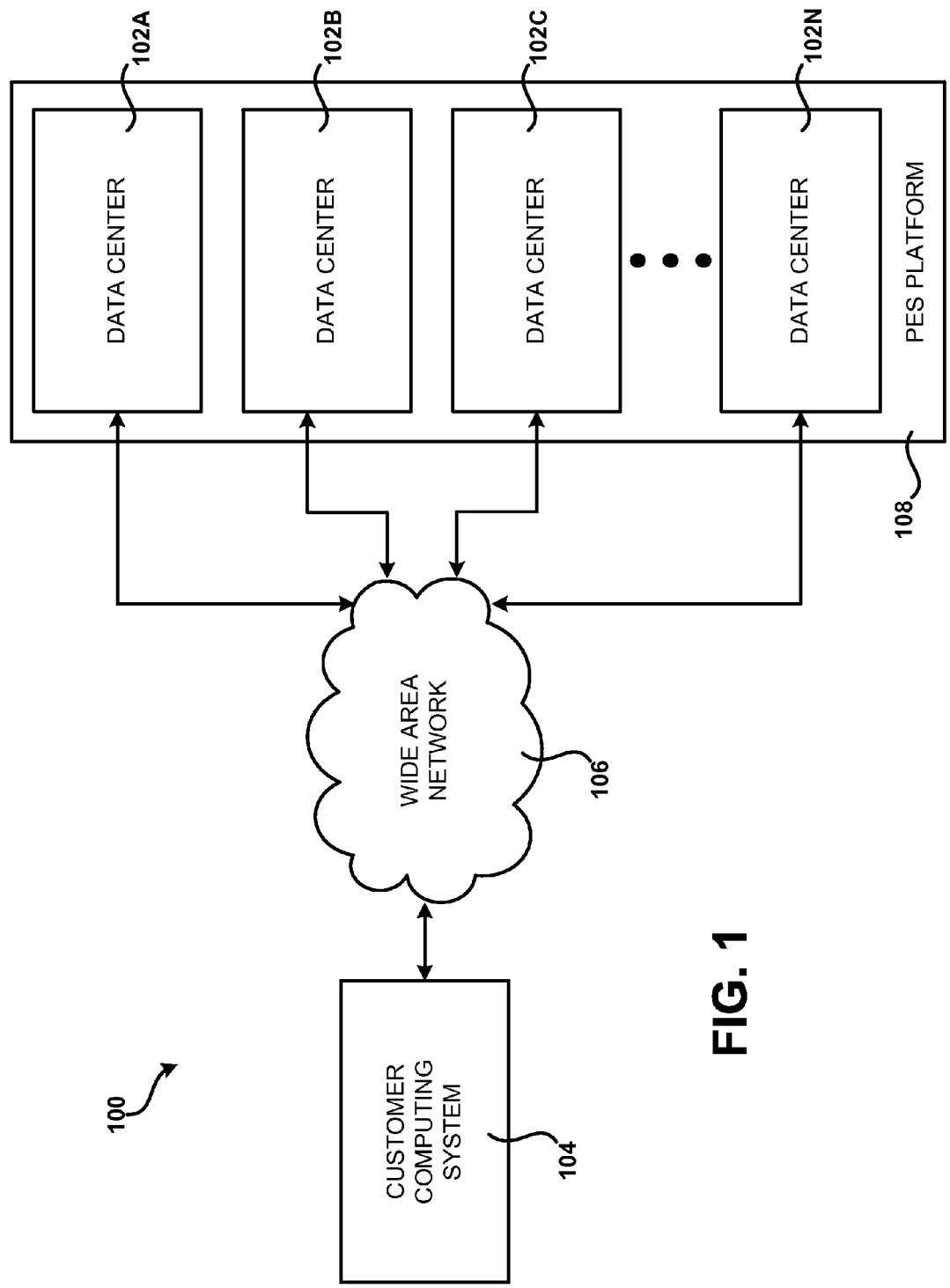
FIG. 1 is a system and network diagram showing aspects of one illustrative operating environment for the embodiments disclosed herein for testing the operation of an API.

The following detailed description is directed to technologies for testing the operation of an API, such as an API exposed by a PES for creating and maintaining virtual machine instances executing within the PES. Utilizing the technologies described herein, a centralized framework for testing the operation of an API can be provided that allows different developers or development teams to provide API tests for testing the operation of API components. The API tests can be deployed and executed on test instances executing within the PES and test results can be collected from the API tests. Development teams can also define user views that can be utilized to generate a textual or graphical user interface showing the test results from one or more API tests, including API tests owned by other development teams. In this manner, development teams can easily create, execute, and view the results of API tests, including results generated by API tests of dependent components owned by other development teams.

According to one aspect disclosed herein, a PES platform is configured to provide instances of computing resources. For example, the PES platform might provide virtual machine instances for executing all or a portion of a distributed application, such as an e-commerce application or another type of distributed application. Software components that implement the PES application are deployed to the virtual machine instances provided by the PES platform. PES applications might be implemented by many different components executing on many different instances. Customers of the PES might be permitted to purchase and utilize the instances under different financial models.

The PES platform is also configured to expose an API for controlling the configuration and execution of virtual machine instances executing within the PES. For instance, the PES platform might expose a Web services API for use by customers of the PES that allows the customers to create, configure, execute, and maintain instances executing on the PES. The PES platform might also provide other types of APIs.

In one embodiment, the PES platform also includes a framework for testing the operation of the APIs provided by the PES platform. The framework may be utilized by developers responsible for the components that implement the API to monitor the health and other operational characteristics of the API components that they are responsible for. Through the use of the framework, a developer can also monitor the health and operation of API components maintained by other developers, such as components that an API component depends upon.

According to one embodiment, the API testing framework includes a test suite data store, a user view data store, and an API testing component. The test suite data store is utilized to store test suites. Test suites include an API test and associated instructions for executing the corresponding API test. An API test is an executable component for testing aspects of an API. For instance, an API test might call a method exposed by an API, determine whether the call was successful, measure the time taken for the call to be processed, and perform other functions. Each API test generates test results that may be stored in a test results data store. API tests may be programmed in any programming language provided that they generate test results in a format compatible with the API testing framework.

User views include a user interface specification that defines a visual layout for presenting test results from one or more test suites. For instance, a developer might define a user interface specification for graphically presenting the test results for an API test of a component that the developer is responsible for along with test results from one or more other API tests of components owned by other developers or development teams. In this manner, a user view can be defined to provide quick access to the test results of only the API tests of interest to a developer.

User views might also include one or more alarm specifications. Alarm specifications define the conditions under which one or more alarm messages are generated based upon the test results received from an API test. Alarm specifications also define one or more recipients of an alarm message in the event that the specified conditions are encountered in test results. In this way, a developer can register to receive alarm messages, such as e-mail, SMS, or other types of messages, when certain conditions relating to the operation of an API component are encountered.

The API testing component is configured to deploy the test suites to one or more test virtual machine instances within the PES. Test virtual machine instances are virtual machine instances that have been created for the purpose of executing the test suites. The test virtual machine instances might be created in the same region, data center, or on the same computer that is utilized to execute customer virtual machine instances. In this manner, the actual network and other conditions experienced by customer virtual machine instances that utilize the API provided by the PES can also be tested.

In one embodiment, the API testing component is configured to handle the versioning of test suites stored in the test suite data store. In this regard, the API testing component might monitor the test suite data store for new test suites or modified versions of test suites previously added to the test suite data store. In response to discovering new test suites or new versions of previous test suites, the API testing component may be configured to automatically deploy the new or modified test suites to the test virtual machine instances. In this manner, the addition of a new or modified test suite to the test suite data store can trigger the deployment and execution of test suites.

Once the test suites have been deployed to the test virtual machine instances, the API tests are executed on the test instances utilizing the instructions associated with each API test for executing the API test. Test results generated by the API tests during or following execution are collected and stored in a test results data store. The API tests may be continually executed and test results collected from the API tests and stored on a pre-defined time schedule (e.g. once per minute). The time taken for each API test to execute might also be monitored and recorded.

As mentioned briefly above, the API testing component might also provide a mechanism by which a developer can request to view test results generated by one or more API tests. For instance, a Web interface might be provided through which a developer can select a user view. The selected user view can then be utilized to generate a user interface that shows the results of one or more API tests referenced by the selected user view. In response to receiving such a request, the API testing component retrieves the appropriate test results from the test results data store and generates the user interface. The user interface is then provided to the requesting user.

The API testing component might also periodically evaluate the alarm specifications to determine whether alarm messages should be generated. For instance, the API testing component might compare the test results stored in the test results data store to the conditions defined by the alarm specifications. Based upon such a comparison, the API testing component may determine whether to generate and transmit alarm messages. The API testing component might also generate a ticket in a support system in response to detecting certain test results.

In one embodiment, the API testing component is also configured to scale the number of test virtual machine instances. For example, the API testing component might determine whether the API tests are taking greater than a predetermined amount of time to complete their execution. If so, the API testing component might cause additional test virtual machine instances to be created. The API tests may then be deployed and executed on the additional test virtual machine instances in the manner described above.

It should be appreciated that the subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, cellular telephone devices, special-purposed hardware devices, network appliances, and the like. The embodiments described herein may also be practiced in distributed computing environments, where tasks are performed by remote processing devices that are linked through a communications network. In a distributed computing environment, program modules may be located in both local and remote memory storage devices.

In the following detailed description, references are made to the accompanying drawings that form a part hereof, and that show, by way of illustration, specific embodiments or examples. The drawings herein are not drawn to scale. Like numerals represent like elements throughout the several figures.

FIG. 1 and the following description are intended to provide a brief, general description of a suitable computing environment in which the embodiments described herein may be implemented. In particular, FIG. 1 is a system and network diagram that shows an illustrative operating environment 100 that includes a PES platform 108.

The PES platform 108 can provide computing resources for executing distributed applications on a permanent or an as-needed basis. The computing resources provided by the PES platform 108 may include various types of resources, such as data processing resources, data storage resources, data communication resources, and the like. Each type of computing resource may be general-purpose or may be available in a number of specific configurations. For example, data processing resources may be available as virtual machine instances. The instances may be configured to execute applications, including Web servers, application servers, media servers, database servers, services, and the like. Data storage resources may include file storage devices, block storage devices, and the like.

Each type or configuration of computing resource may be available in different sizes, such as large resources, consisting of many processors, large amounts of memory, and/or large storage capacity, and small resources consisting of fewer processors, smaller amounts of memory, and/or smaller storage capacity. Customers may choose to allocate a number of small processing resources as Web servers and/or one large processing resource as a database server, for example.

The computing resources provided by the PES platform 108 are enabled by one or more data centers 102A-102N (which may be referred to herein singularly as "a data center 102" or in the plural as "the data centers 102"). The data centers 102 are facilities utilized to house and operate computer systems and associated components. The data centers 102 typically include redundant and backup power, communications, cooling, and security systems. The data centers 102 might also be located in geographically disparate locations. One illustrative configuration for a data center 102 that implements the concepts and technologies disclosed herein for testing an API will be described below with regard to FIG. 2.

The customers and other consumers of the PES platform 108 may access the computing resources provided by the data centers 102 over a wide-area network ("WAN") 106. Although a WAN is illustrated in FIG. 1, it should be appreciated that a local-area network ("LAN"), the Internet, or any other networking topology known in the art that connects the data centers 102 to remote consumers may be utilized. It should also be appreciated that combinations of such networks might also be utilized.

The customer computing system 104 is a computer utilized by a customer or other consumer of the PES platform 108. For instance, the customer computing system 104 may be a server computer, a desktop or laptop personal computer, a tablet computer, a wireless telephone, a personal digital assistant ("PDA"), an e-reader, a game console, a set-top box, or any other computing device capable of accessing the PES platform 108.

The customer computing system 104 may be utilized to access and configure aspects of the computing resources provided by the PES platform 108. In this regard, the PES platform 108 might provide a Web interface through which aspects of its operation may be configured through the use of a Web browser application program executing on the customer computing system 104. Alternatively, a stand-alone application program executing on the customer computing system 104 might access an API exposed by the PES platform 108 for performing the configuration operations. Other mechanisms for configuring the operation of the PES platform 108 might also be utilized.

According to embodiments disclosed herein, the capacity of purchased computing resources provided by the PES platform 108 can be scaled in response to demand. In this regard, scaling refers to the process of instantiating (which may also be referred to as "launching" or "creating") or terminating (which may also be referred to as "de-scaling") instances of computing resources in response to demand. In this manner, the capacity of resources purchased by a customer of the PES platform 108 can be scaled on-demand. As will be described in greater detail below, the testing of an API provided by the PES platform 108 might be scaled by adding new instances of computing resources that are utilized to execute API tests.

Auto scaling is one mechanism for scaling computing resources in response to increases or lulls in demand for the resources. Auto scaling allows customers of the PES platform 108 to configure the platform 108 to scale their purchased computing resources according to conditions defined by the customer. For instance, rules may be defined for scaling up capacity in a particular manner in response to the occurrence of specified conditions, such as a spike in demand. Similarly, rules might also be defined to scale down capacity in a particular manner in response to the occurrence of other conditions, such as a lull in demand.

The PES platform 108 may also be configured with a deployment component to assist customers in the deployment of new instances of computing resources. The deployment component may receive a configuration from a customer that includes data describing how new instances should be configured. For example, the configuration might specify one or more applications or software components that should be installed in new instances, provide scripts and/or other types of code to be executed in new instances, provide cache warming logic specifying how an application cache should be prepared, and other types of information. The deployment component utilizes the customer-provided configuration and cache warming logic to launch, configure, and prime new instances of computing resources. The PES might also provide an API for deploying new instances.

The deployment component might also provide functionality for assisting customers with the deployment of updates to existing instances of computing resources. Through this mechanism, a customer can indicate that an update, or updates, is to be applied to an application executing on the PES platform. In response thereto, the deployment component is configured to apply the update to the application in an optimized fashion that satisfies any business or technical requirements of the customer.

Figure 2:
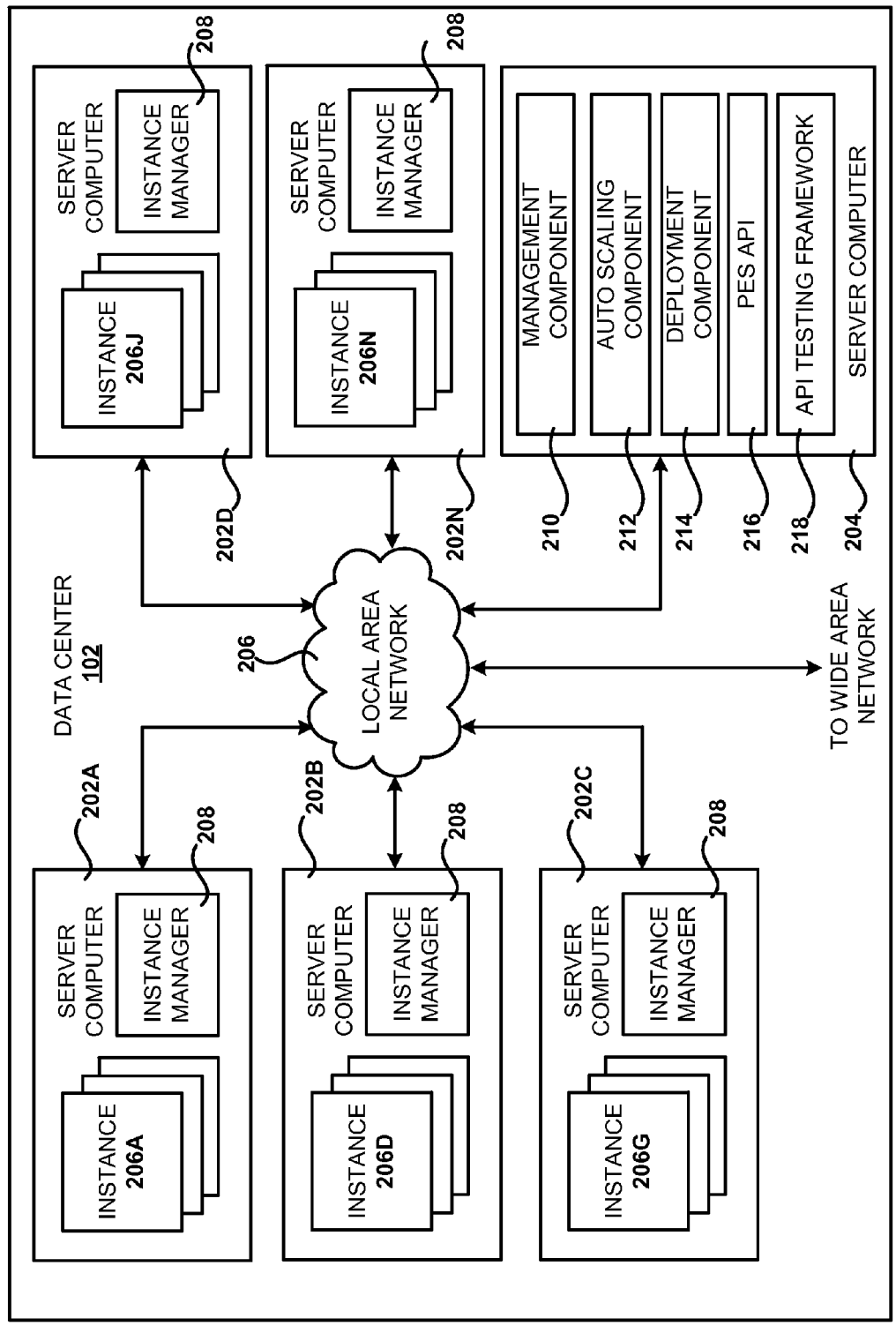
FIG. 2 is a computing system diagram that illustrates a configuration for a data center that implements a framework disclosed herein for testing the operation of an API according to one embodiment.

FIG. 2 is a computing system diagram that illustrates one configuration for a data center 102 that implements a PES platform 108, including an implementation of the concepts and technologies disclosed herein for testing an API provided by the PES platform 108. The example data center 102 shown in FIG. 2 includes several server computers 202A-202N (which may be referred to herein singularly as "a server computer 202" or in the plural as "the server computers 202")

for providing computing resources for executing an application. The server computers 202 may be standard server computers configured appropriately for providing the computing resources described above. For instance, in one implementation the server computers 202 are configured to provide instances 206A-206N of computing resources.

In one embodiment, the instances 206A-206N (which may be referred to herein singularly as "an instance 206" or in the plural as "the instances 206") are virtual machine instances. As known in the art, a virtual machine instance is an instance of a software implementation of a machine (i.e. a computer) that executes programs like a physical machine. In the example of virtual machine instances, each of the servers 202 may be configured to execute an instance manager 208 capable of executing the instances. The instance manager 208 might be a hypervisor or another type of program configured to enable the execution of multiple instances 206 on a single server 202, for example. As discussed above, each of the instances 206 may be configured to execute all or a portion of an application.

It should be appreciated that although the embodiments disclosed herein are described primarily in the context of virtual machine instances, other types of instances can be utilized with the concepts and technologies disclosed herein. For instance, the technologies disclosed herein might be utilized with instances of storage resources, instances of data communications resources, and with other types of resources. The embodiments disclosed herein might also execute all or a portion of an application directly on a computer system without utilizing virtual machine instances.

The data center 102 shown in FIG. 2 also includes a server computer 204 reserved for executing software components for managing the operation of the data center 102, the server computers 202, and the instances 206. In particular, the server computer 204 might execute a management component 210. As discussed above, a customer of the PES platform 108 might utilize the customer computing system 104 to access the management component 210 to configure various aspects of the operation of PES platform 108 and the instances 206 purchased by the customer. For example, the customer may purchase instances and make changes to the configuration of the instances. The customer might also specify settings regarding how the purchased instances are to be scaled in response to demand.

The auto scaling component 212 scales the instances 206 based upon rules defined by a customer of the PES platform 108. For instance, the auto scaling component 212 might allow a customer to specify scale up rules for use in determining when new instances should be instantiated and scale down rules for use in determining when existing instances should be terminated. The auto scaling component 212 might also be utilized to create new instances for use in testing an API provided by the PES platform 108.

As discussed briefly above, the data center 102 is also configured with a deployment component 214 to assist customers in the deployment of new instances 206 of computing resources. The deployment component 214 may receive a configuration from a customer that includes data describing how new instances 206 should be configured. For example, the configuration might specify one or more applications that should be installed in new instances 206, provide scripts and/or other types of code to be executed for configuring new instances 206, provide cache warming logic specifying how an application cache should be prepared, and other types of information. The deployment component 214 might also be utilized to create test instances for executing API tests in the manner described below.

According to one embodiment, the server computer 204 is also configured to expose a PES API 216 ("the API") for controlling the configuration and execution of virtual machine instances executing within the PES platform 108. In one embodiment, the API 216 is a Web services API exposed by the PES platform 108 for use by customers of the PES platform 108 that allows the customers to create, configure, execute, and maintain virtual machine instances executing on the PES platform 108. The PES platform 108 might also provide other types of APIs that may be tested in the manner described herein.

In one embodiment, the PES platform also includes an API testing framework 218 ("the framework") for testing the operation of the API 216. Developers responsible for components that implement aspects of the API 216 may utilize the framework 218 to monitor the health and other operational characteristics of the API components that they are responsible for. Through the use of the framework 218, a developer can also monitor the health and operation of API components maintained by other developers, such as components that an API component depends upon. Details regarding the operation of the framework 218 will be provided below with regard to FIGS. 4-12.

In the example data center 102 shown in FIG. 2, an appropriate LAN 206 is utilized to interconnect the server computers 202A-202N and the server computer 204. The LAN 206 is also connected to the WAN 106 illustrated in FIG. 1. It should be appreciated that the network topology illustrated in FIGS. 1 and 2 has been greatly simplified and that many more networks and networking devices may be utilized to interconnect the various computing systems disclosed herein. Appropriate load balancing devices or software modules might also be utilized for balancing a load between each of the data centers 102A-102N, between each of the server computers 202A-202N in each data center 102, and between instances 206 purchased by each customer of the PES platform 108. These network topologies and devices should be apparent to those skilled in the art.

It should be appreciated that the data center 102 described in FIG. 2 is merely illustrative and that other implementations might be utilized. In particular, functionality described herein as being performed by the API testing framework 218 might be performed by other components or by a combination of components. Additionally, it should be appreciated that this functionality might be implemented in software, hardware, or a combination of software and hardware. Other implementations should be apparent to those skilled in the art.

Figure 3:
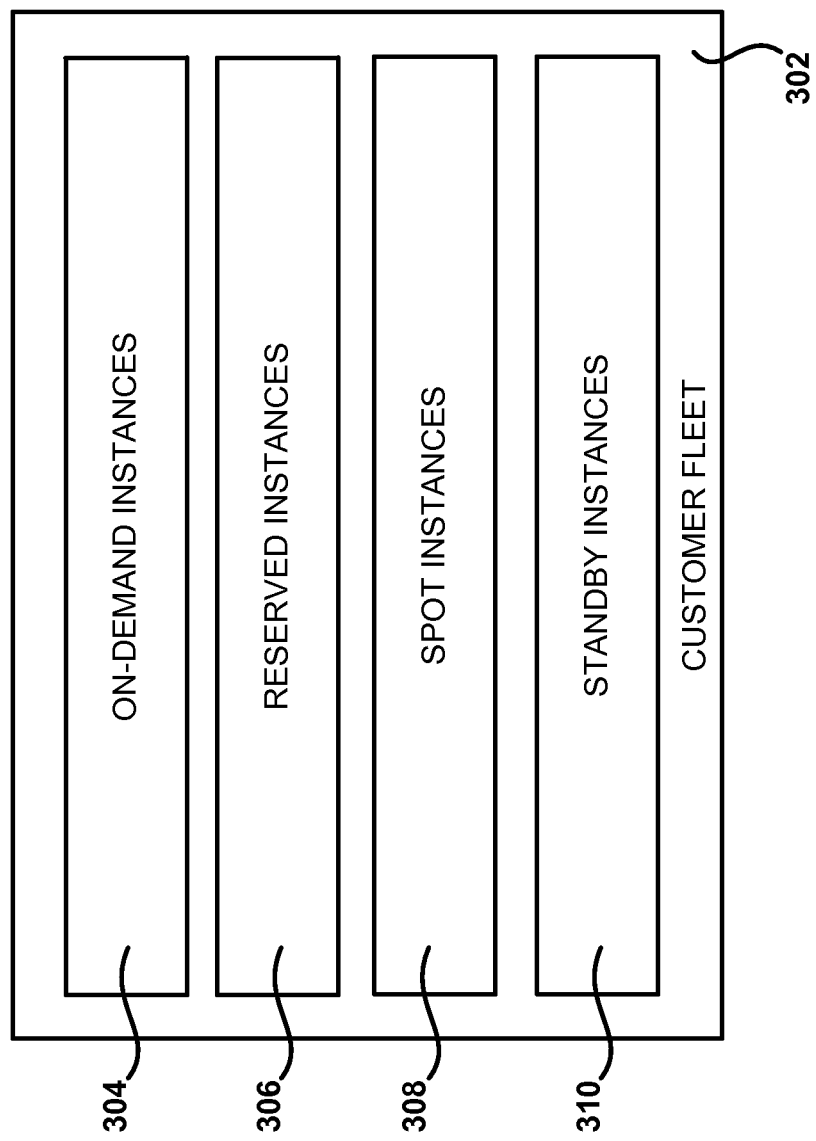
FIG. 3 is a block diagram illustrating various types of instances of computing resources that might be found in a customer fleet utilized to implement a PES application, according to embodiments disclosed herein.

FIG. 3 is a block diagram illustrating several types of instances 206 of computing resources that might be utilized in a customer fleet 302 to implement a PES application, according to embodiments disclosed herein. As used herein, the term "fleet" refers to all of the virtual machine instances purchased and/or operated by a customer of the PES platform 108. As shown in FIG. 3, the instances provided by the PES platform 108 may be on-demand instances 304, reserved instances 306, spot instances 308, and standby instances 310. Other types of instances not shown in FIG. 3 or described herein might also be provided.

The on-demand instances 304, which might also be referred to as "regular" instances, are instances that are paid for and in active use by a customer. The on-demand instances 304 allow customers of the PES platform 108 to pay for capacity per unit of time, such as an instance-hour, without requiring a long-term commitment. This frees the customer from the costs and complexities of planning, purchasing, and maintaining hardware and transforms what are commonly large fixed costs into much smaller variable costs.

The reserved instances 306 are instances of a computing resource that are reserved for a customer in exchange for a payment. The reserved instances 306 provide the customer the option to make a one-time payment for each instance they want to reserve. In turn, the customer may receive a significant discount on the hourly usage charge for the reserved instances 306 as compared to the on-demand instances 304. After the customer makes a one-time payment for the reserved instances 306, the reserved instances 306 are reserved for the customer and the customer has no further obligation. The customer may choose to run the reserved instances 306 for the discounted usage rate for the duration of a chosen term. If the customer does not use the reserved instances 306, the customer will not pay usage charges on these instances.

The spot instances 308 allow customers to bid on unused capacity in the PES platform 108. The customer can run the spot instances 308 for as long as their bid exceeds a current market price, referred to herein as the spot instance market price, which may fluctuate based upon supply and demand. The spot instances 308 may be terminated if a customer's maximum bid no longer exceeds the current spot instance market price.

In order to obtain the spot instances 308, the customer places a request for the spot instances 308 that specifies the desired number of spot instances 308 and the maximum price the customer is willing to pay per instance hour. If the customer's maximum price bid exceeds the current spot instance market price for the spot instances 308, the customer's request will be fulfilled and the customer's spot instances 308 will run until either the customer chooses to terminate them or the market price increases above the customer's maximum price (whichever is sooner). Various components operating within the PES platform 108 may manage the market for the spot instances 308, including setting the current spot instance market price for the spot instances 308.

The standby instances 310 are spot instances 308 that have been acquired on behalf of a customer and that are made ready for near immediate use by the customer in the manner described herein. The price charged for the standby instances 310 is typically less than the price charged for the on-demand instances 304, since the standby instances 310 may be terminated in the same manner as the spot instances 308. In one embodiment, the standby instances 310 are priced higher than the spot instances 308 and the reserved instances 306, but lower than the on-demand instances 304. It should be appreciated, however, that the various pricing mechanisms described above for the on-demand instances 304, reserved instances 306, spot instances 308, and standby instances 310 are merely illustrative and that other mechanisms may be utilized to set the pricing for the various instance types.

Figure 4:
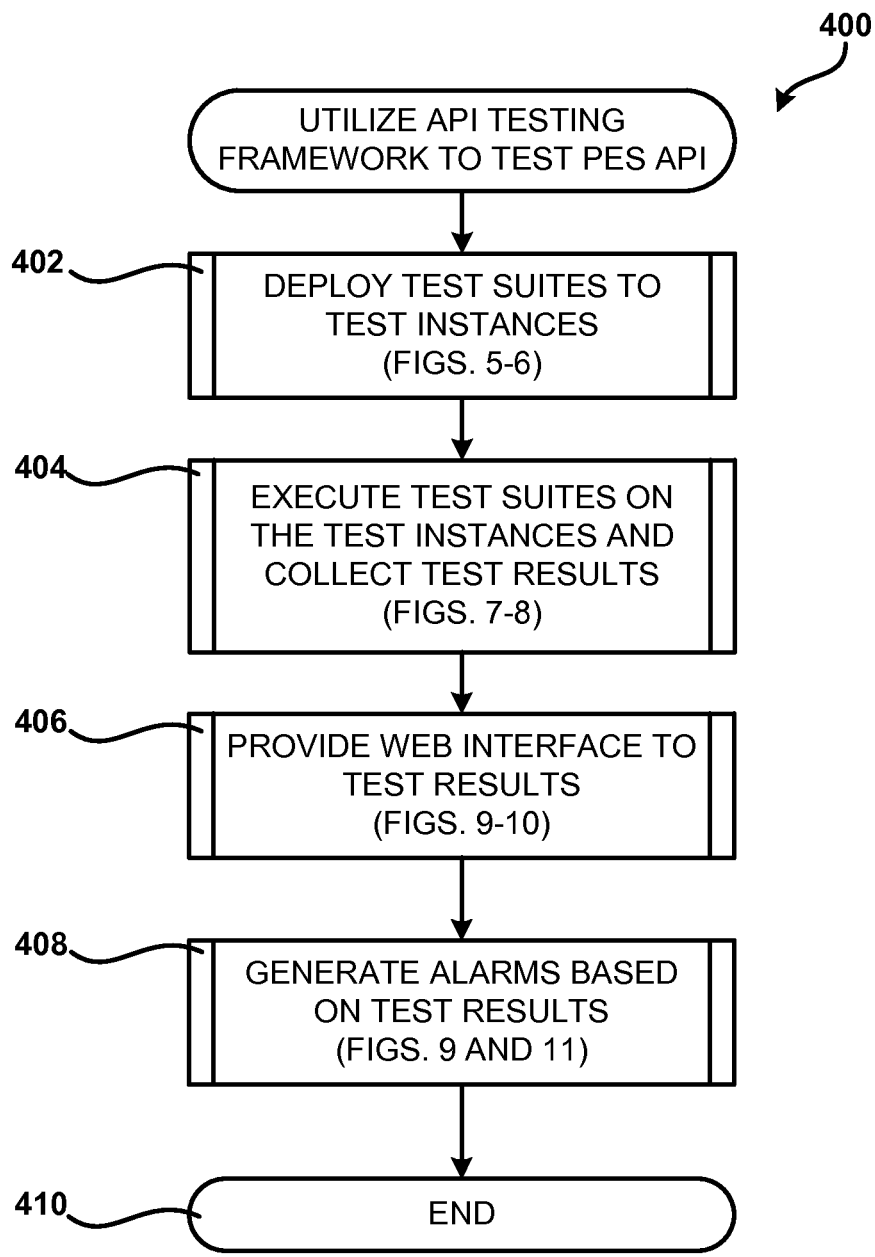
FIG. 4 is a flow diagram showing one illustrative routine for testing the operation of an API provided by a PES, according to one embodiment disclosed herein.

Turning now to FIG. 4, additional details will be provided regarding one illustrative process disclosed herein for testing the operation of the API 216. It should be appreciated that the logical operations described herein with respect to FIG. 4 and the other FIGURES are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the figures and described herein. These operations may also be performed in parallel, or in a different order than those described herein.

FIG. 4 is a flow diagram showing a routine 400 that illustrates aspects of one mechanism disclosed herein for testing the operation of the API 216 exposed by the PES platform 108. In one embodiment, the operations illustrated in the routine 400 are performed by components provided by the API testing framework 218. It will be appreciated that other modules or components may also perform all or a portion of the routine 400, such as the management component 210, the deployment component 214, the auto scaling component 212, or other systems or components not shown in the FIGURES. A combination of modules and components might also perform the operations illustrated in the routine 400.

The routine 400 begins at operation 402, where the framework 218 deploys test suites to one or more test virtual machine instances ("test instances"). As will be described in greater detail below, test suites include API tests for testing functionality provided by the API 216. The test instances are virtual machine instances created for the purpose of executing the API tests. Additional details regarding the framework 218 and the deployment of test suites to test instances will be provided below with regard to FIGS. 5-6.

Once the test suites have been deployed to the test instances, the routine 400 proceeds from operation 402 to operation 404. At operation 404, the API tests provided by the test suites are executed on the test instances. Test results generated from the execution of the API tests are then collected and stored. Details regarding the execution of the API tests and the collection and storage of test results will be provided below with regard to FIGS. 7-8.

Once test results have been collected and stored, the routine 400 proceeds to operation 406, where a user interface is provided for viewing the test results. In one embodiment, components provided by the framework 218 are configured to generate a Web-based user interface for viewing the test results through the use of developer-provided user views that define the API test results that should be included in the user interface. Other types of user interfaces might also be provided. Additional details regarding the provision of a user interface for viewing the test results will be provided below with regard to FIGS. 9-10.

From operation 406, the routine 400 proceeds to operation 408. At operation 408, components provided by the framework 218 are executed to generate alarms based upon the test results. For instance, components within the framework 218 might be configured to cause an alarm message, such as an e-mail or SMS message, to be generated in response to identifying certain developer-specified conditions in the test results. Additional details regarding the generation of alarms will be provided below with regard to FIGS. 9 and 11. From operation 408, the routine 400 proceeds to operation 410, where it ends.

Figure 5:
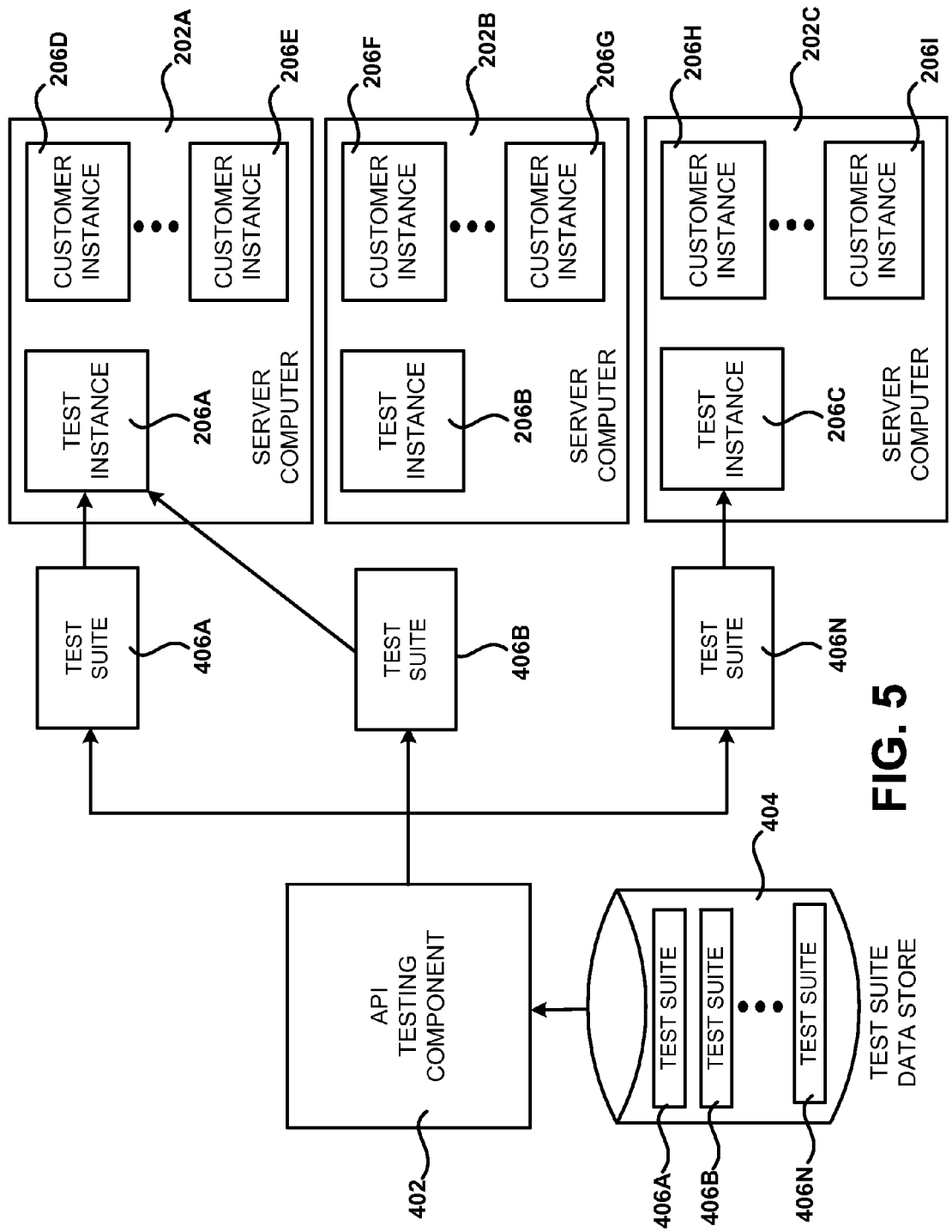
FIG. 5 is a computing system diagram that illustrates the deployment of test suites by an API testing component in one embodiment disclosed herein.

FIG. 5 is a computing system diagram that illustrates the deployment of test suites 406A-406N (which may be referred to individually as a test suite 406 or collectively as the test suites 406) by an API testing component 402 in one embodiment disclosed herein. In the embodiment shown in FIG. 5, the framework 218 includes an API testing component 402, a test suite data store 404, a test results data store (not shown in FIG. 5), and a user view data store (also not shown in FIG. 5). Each of these components provided by the framework 218 will be described in greater detail below.

The test suite data store 404 is utilized to store the test suites 406. The test suite data store 404 might be implemented as an electronic database utilizing a suitable database technology. The test suite data store 404 might also be implemented in other ways known to those skilled in the art.

Each of the test suites 406 includes an API test and associated instructions for executing the corresponding API test. An API test is an executable component for testing aspects of the API 216. For instance, an API test might call a method exposed by the API 216, determine whether the call was successful, measure the time taken for the call to be processed, and perform other functions. Each API test generates test results that may be stored in a test results data store. Details regarding the test results data store will be provided below with regard to FIG. 7.

The API testing component 402 is an executable component that is provided by the framework 218. The API testing component 402 is configured to deploy the test suites 406 to one or more test virtual machine instances 206A-206C (which may be referred to herein individually as a test instance 206 or collectively as the test instances 206) executing within the PES platform 108. The test instances 206 are virtual machine instances that have been created for the purpose of executing the test suites 406. As shown in FIG. 5, one or more test suites 406 might be deployed to each of the test instances 206. For instance, in FIG. 5, the test suite 406A is being deployed to the test instance 206A, the test suite 406B is also being deployed to the test instance 206A, and the test suite 406N is being deployed to the test instance 206C. It should be appreciated that, in various implementations, a single test suite 406 might be deployed to a single test instance 206, a single test suite 406 might be deployed to multiple test instances 206, multiple test suites 406 might be deployed to a single test instance 206, or multiple test suites 406 might be deployed to multiple test instances 206. The decision as to whether a test suite is deployed to one or more test instances may be made based upon the type of tests being performed, the location of the test instances, or other factors.

The test instances 206 might be created in the same region, data center, or on the same server computer that is utilized to execute the customer virtual machine instances 206D-206I. For example, in the embodiment shown in FIG. 5, the test instance 206A is executing on the same server computer 202A as the customer instances 206D-206E, the test instance 206B is executing on the same server computer 202B as the customer instances 206F-206G, and the test instance 206C is executing on the same server computer 202C as the customer instances 206H-206I. In this manner, the actual network and other conditions experienced by the customer virtual machine instances 206D-206I that utilize the API 216 provided by the PES platform 108 can also be tested.

It should be appreciated that the test instances 206A-206C are stateless and may be disposed of and recreated at any time. For instance, in one embodiment the API testing component 402 is configured to determine if a test instance 206 has become unresponsive or encountered another type of issue that prevents the instance from functioning properly. In response to detecting such a condition, the API testing component 402 might cause a test instance 206 to be terminated. The API testing component 402 might also cause a new test instance 206 to be instantiated and cause a test suite 406 to be deployed to the new test instance 206 and executed.

In one embodiment, the API testing component 402 is configured to handle the versioning of the test suites 406 stored in the test suite data store 404. In this regard, the API testing component 402 may be configured to monitor the test suite data store 404 for new test suites 406 or modified versions of test suites 406 previously added to the test suite data store 404. In response to discovering new test suites 406 or new versions of previous test suites 406, the API testing component 402 might automatically deploy the new or modified test suites 406 to the test instances 206. In this manner, the addition of a new or modified test suite 406 to the test suite data store 404 can trigger the deployment and execution of the test suites 406. Additional details regarding this process will be provided below with regard to FIG. 6.

Figure 6:
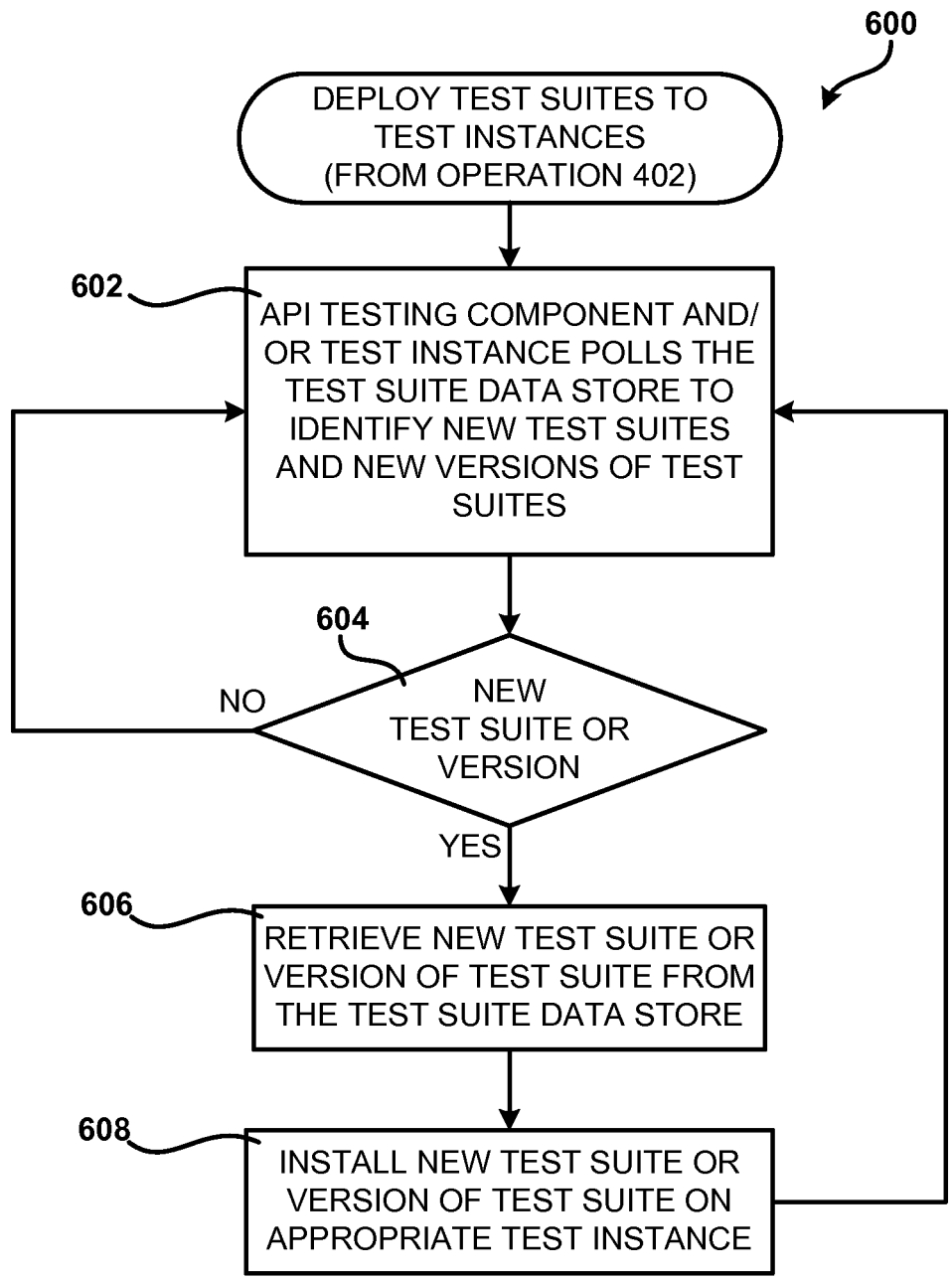
FIG. 6 is a flow diagram showing one illustrative routine for deploying test suites to test virtual machine instances in one embodiment disclosed herein.

FIG. 6 is a flow diagram showing one illustrative routine 600 for deploying test suites 406 to the test instances 206 in one embodiment disclosed herein. The routine 600 begins at operation 602, where the API testing component 402 polls the test suite data store 404 to determine if new test suites 406 or new versions of test suites 406 have been added. In other embodiments, the API tests executing on the test instances 206 might poll the test suite data store 406 for new versions. From operation 602, the routine 600 proceeds to operation 604.

At operation 604, the API testing component 402 or the API test determines whether a new test suite 406 or a new version of a test suite 406 has been added to the test suite data store 404. If not, the routine 600 proceeds back to operation 602 where additional polling of the test suite data store 404 may occur. If a new test suite 406 or a new version of a test suite 406 has been added to the test suite data store 404, the routine 600 proceeds from operation 604 to operation 606.

At operation 606, the API testing component 402 or the API test retrieves the new test suite 406 or the new version of the test suite 406 from the test suite data store 404. The routine 600 then proceeds to operation 608, where the new or modified test suite 406 is then deployed to one or more of the test instances 206. Deployment might include copying the test suite 406 to the appropriate test instance 206, installing the test suite 406 on the test instance 206, and causing the API test to be executed on the test instance 206. Details regarding the execution of the API tests on the test instances 206 will be provided below with regard to FIGS. 7-8. From operation 608, the routine 600 proceeds back to operation 602, where additional polling of the test suite data store 404 and deployment of test suites 406 may occur in the manner described above.

Figure 7:
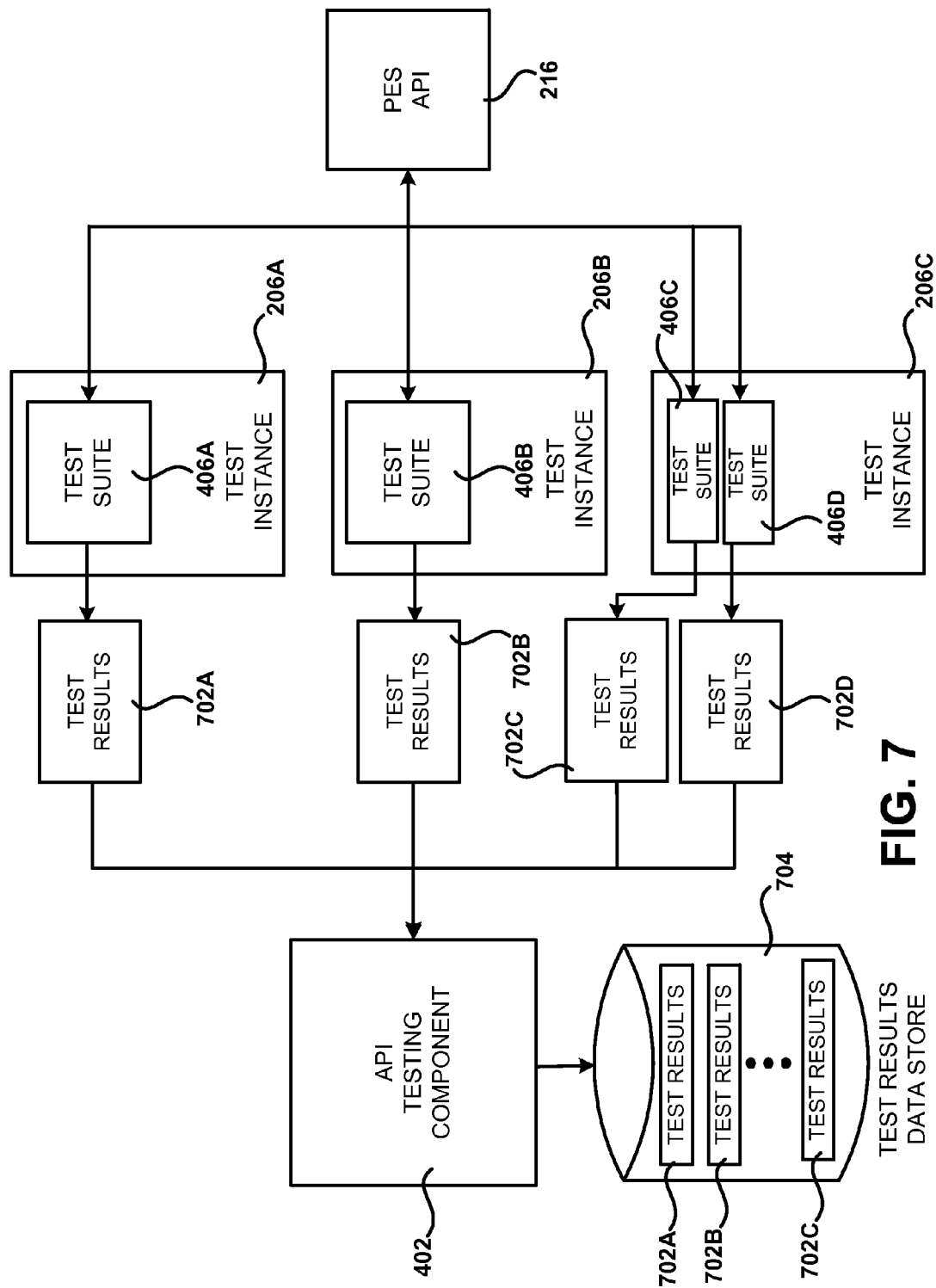
FIG. 7 is a computing system diagram that illustrates the collection of test results from one or more test suites executing on test virtual machine instances according to one embodiment disclosed herein.

FIG. 7 is a computing system diagram that illustrates the collection of test results 702A-702D from one or more test suites 406 executing on the test instances 206 according to one embodiment disclosed herein. As described briefly above, each of the test suites 406 includes an API test and instructions for executing the API test on a test instance 206.

The instructions for executing an API test may be provided in the form of a shell script or other type of script or executable component that provides instructions defining how and when the API test should be executed. In one embodiment, the instructions are configured for inclusion in a cron table ("crontab") file. As known in the art, a crontab file is a configuration file that specifies commands to run periodically on a given schedule. The crontab file is utilized by a time-based job scheduler called "cron" that is provided in Unix-like computer operating systems. Cron enables users to schedule jobs (commands or shell scripts) to run periodically at certain times or dates. Other types of instructions might also be provided that indicate the manner in which an API test should be executed on a test instance 206.

When the API tests are executed on the test instances 206, the API tests are configured to test aspects of the operation of the API 216. As mentioned above, the API tests may call methods exposed by the API, determine the success or failure of the calls, and capture data defining how long the calls took to complete and other aspects of the success or failure of each API call.

The information collected by the API tests during the performance of the API test is stored as test results 702A-702D. In the example shown in FIG. 7, a test suite 406A executing on the test instance 206A has generated the test results 702A, the test suite 406B executing on the test instance 206B has generated the test results 702B, and the test suites 406C and 406D executing on the test instance 206C have generated the test results 702C and 702D, respectively.

The test results 702 may be stored utilizing an appropriate extensible markup language ("XML") schema or in another manner. The API tests might also provide the test results 702 to the API testing component 402 for storage in a test results data store 704. The API tests might also store the test results 702 directly in the test results data store 704. The test results data store 704 is a database or other type of data storage object or device configured for the storage of the test results 702. Once the test results 702 have been stored in the test results data store 704, the API testing component 402 may provide the test results 702 to a developer by way of an appropriate user interface in the manner described below.

Figure 8:
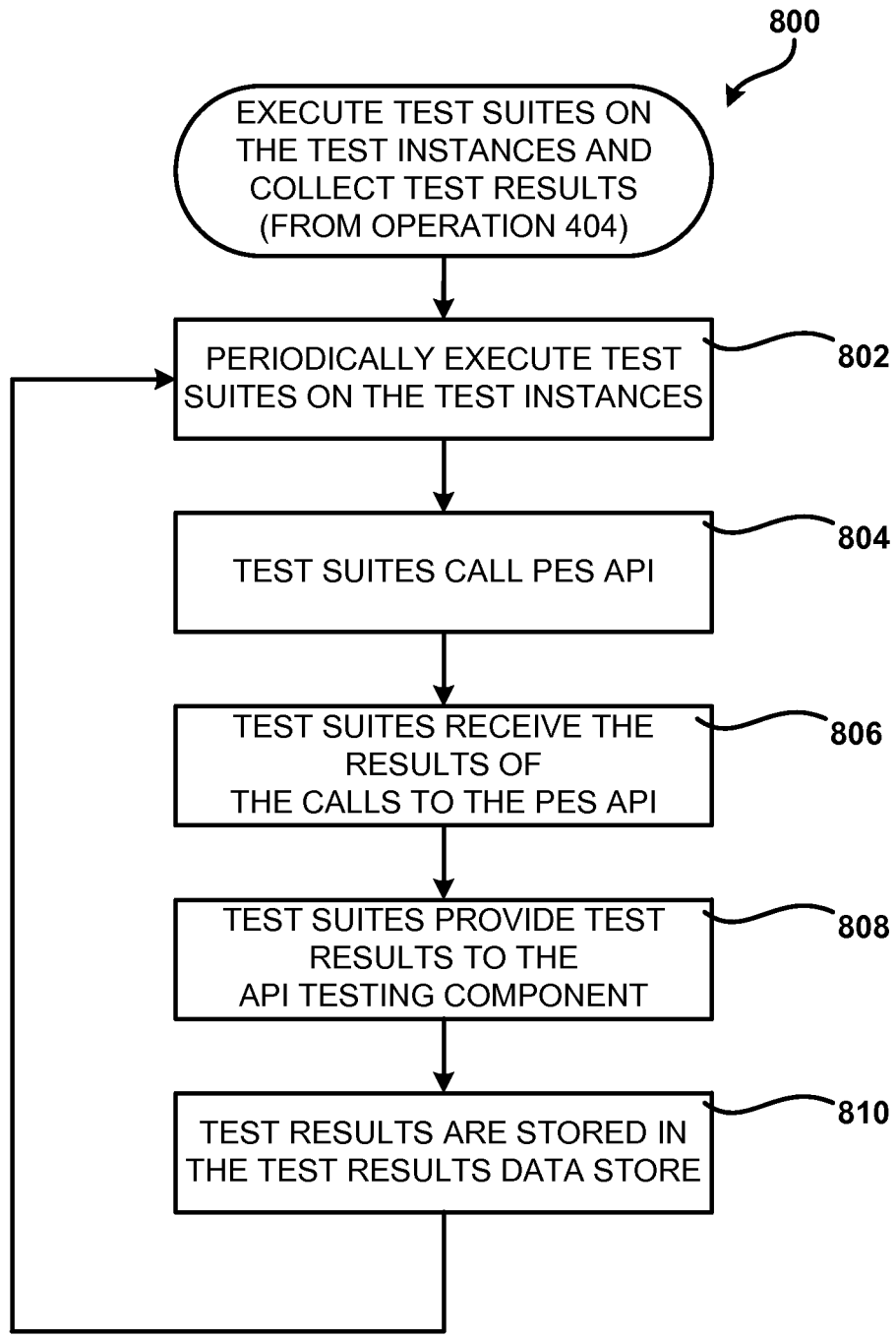
FIG. 8 is a flow diagram showing one illustrative routine for executing test suites and collecting test results from the test suites according to one embodiment disclosed herein.

FIG. 8 is a flow diagram showing one illustrative routine for executing the API tests in the test suites 406 and for collecting the test results 702 according to one embodiment disclosed herein. The routine 800 begins at operation 802, where the API tests in the test suites 406 are periodically executed on the test instances 206. As discussed above, the instructions associated with each API test may be utilized to execute the API tests according to a pre-defined schedule. From operation 802, the routine 800 proceeds to operation 804.

At operation 804, the executing API tests call methods exposed by the API 216 in order to test the functionality provided by the API 216. The API tests receive the results of the API calls at operation 806 and record the test results 702. As discussed above, the test results 702 might include various types of information describing the success or failure of the API calls made by the API tests. The routine 800 then proceeds to operation 808.

At operation 808, the API tests provide the test results 702 to the API testing component 402 for storage in the test results data store 704. Alternately, the API tests might store the test results 702 directly in the test results data store 704. In this manner, the test results 702 are stored in the test results data store 704 at operation 810. As will be described in greater detail below with regard to FIGS. 9-10, the API testing component 402 may utilize the test results 702 stored in the test results data store 704 to provide a user interface for viewing the test results 702 and/or for generating alarm messages. From operation 810, the routine 800 proceeds back to operation 802, where the process described above may be periodically repeated in order to continually test the operation of the API 216. For instance, the process described above might be repeated every minute or other specified unit of time.

Figure 9:
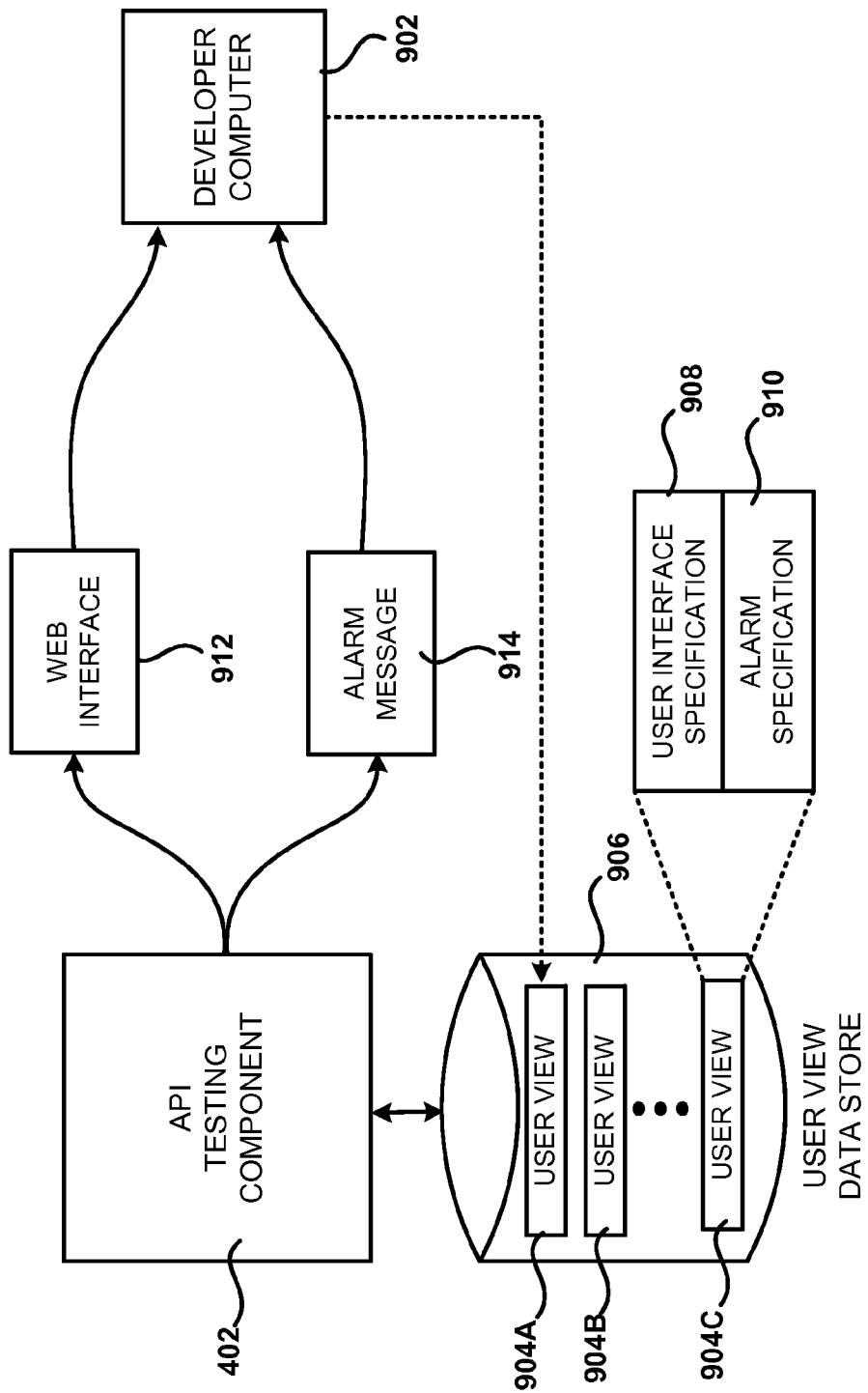
FIG. 9 is a computing system diagram that illustrates the provision of a user interface for viewing test results and alarm messages by an API testing component according to one embodiment disclosed herein.

FIG. 9 is a computing system diagram that illustrates the provision of a user interface 912 for viewing test results 702 and for generating alarm messages 914 by the API testing component 402 according to one embodiment disclosed herein. As mentioned above, the API testing component 402 is configured to provide a mechanism in one embodiment by which a developer can request to view the test results 702 generated by one or more API tests. For instance, the API testing component 402 might provide a Web interface 912 through which a developer can view the test results 702 generated by of one or more of the API tests. In order to provide this functionality, the API testing component utilizes user views 904A-904C stored in a user view data store 906.

Each of the user views 904 includes a user interface specification 908 that defines a visual layout for presenting test results 702 from one or more test suites 406. For instance, a developer might define a user interface specification 908 for presenting the test results 702 for an API test of a component that the developer is responsible for along with test results 702 from one or more other API tests of components owned by other developers or development teams. The user views 904 may be defined utilizing XML or another suitable declarative language. In this manner, a user view 904 can be defined to provide quick access to the test results 702 of only the API tests of interest to a developer.

As illustrated in FIG. 9, each of the user views 904 might also include one or more alarm specifications 910. Alarm specifications 910 define the conditions under which one or more alarm messages 914 are to be generated based upon the test results 702 received from an API test. In this way, a developer can register to receive alarm messages 914, such as e-mail, SMS, or other types of messages, when certain conditions relating to the operation of an API component are encountered.

In order to view test results 702, the API testing component 402 might provide a Web user interface through which a developer using a developer computer 902 can select a user view 904. The selected user view 904 can then be utilized to generate a Web interface 912 that shows the results of one or more API tests referenced by the selected user view 904. In response to receiving such a request, the API testing component 402 retrieves the appropriate test results 702 from the test results data store 704 and generates the Web interface 912. The Web interface 912 is then provided to the developer computer 902.

It should be appreciated that although the interface provided by the API testing component 402 is described as a Web interface, other types of user interfaces might be provided. For instance, a client application may be executed on the developer computer 902 that is configured to receive and display test results 702 using the user views 904. Alternately, an e-mail message, an SMS message, or another type of message may be transmitted to the developer computer 902 that include test results 702 formatted according to a user view 904. Other types of textual and graphical user interfaces might also be provided.

As mentioned above, the API testing component 402 might also periodically evaluate the alarm specifications 910 stored in the user view data store 906 in order to determine whether alarm messages 914 should be generated. For instance, the API testing component 402 might periodically compare the test results 702 stored in the test results data store 704 to the conditions defined by the alarm specifications 910. Based upon the results of such a comparison, the API testing component 402 may determine whether to generate and transmit the alarm messages 914. In other embodiments, the API testing component 402 might also generate a ticket in a support system in response to detecting certain test results 702. Additional details regarding the provision of a user interface for viewing the test results 702 are provided below with regard to FIG. 10. Additional details regarding the generation of the alarm messages are provided below with regard to FIG. 11.

Figure 10:
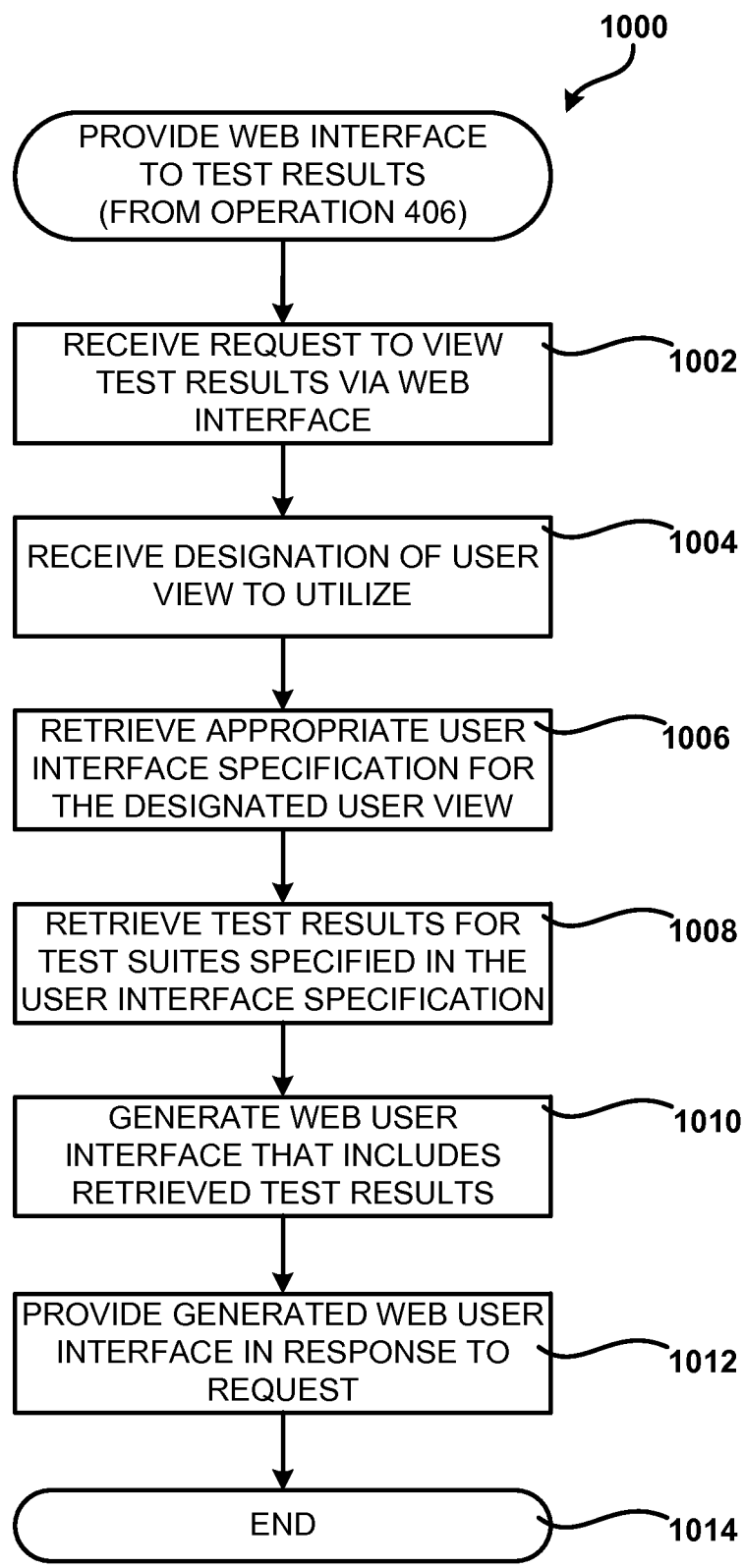
FIG. 10 is a flow diagram showing one illustrative routine for providing a Web interface to test results generated by API tests in one embodiment disclosed herein.

FIG. 10 is a flow diagram showing one illustrative routine for providing a user interface for viewing the test results 702 generated by API tests in one embodiment disclosed herein. The routine 1000 begins at operation 1002, where the API testing component 402 receives a request to view test results 702 generated by one or more of the API tests. As mentioned above, this request may be received from a developer computer 902 in the form of a request to view test results 702 specified by one of the user views 904. In this regard, the API testing component 402 might provide an appropriate user interface through which a user view 904 may be selected. At operation 1004, the API testing component 402 receives the designation of a user view 904 to utilize when creating the Web interface 912.

From operation 1004, the routine 1000 proceeds to operation 1006, where the API testing component 402 retrieves the user interface specification 908 for the selected user view 904. The routine 1000 then continues to operation 1008, where the API testing component 402 retrieves the test results 702 from the test results data store 704 for the API tests specified in the user interface specification 908. The routine 100 then proceeds to operation 1010.

At operation 1010, the API testing component 402 generates the Web interface 912 using the retrieved test results 702 for the API tests identified in the user interface specification 908. The API testing component 402 then provides the generated Web interface 912 to the developer computer 902 in response to the request to view the test results 702. From operation 1012, the routine 1000 proceeds to operation 1014, where it ends.

Figure 11:
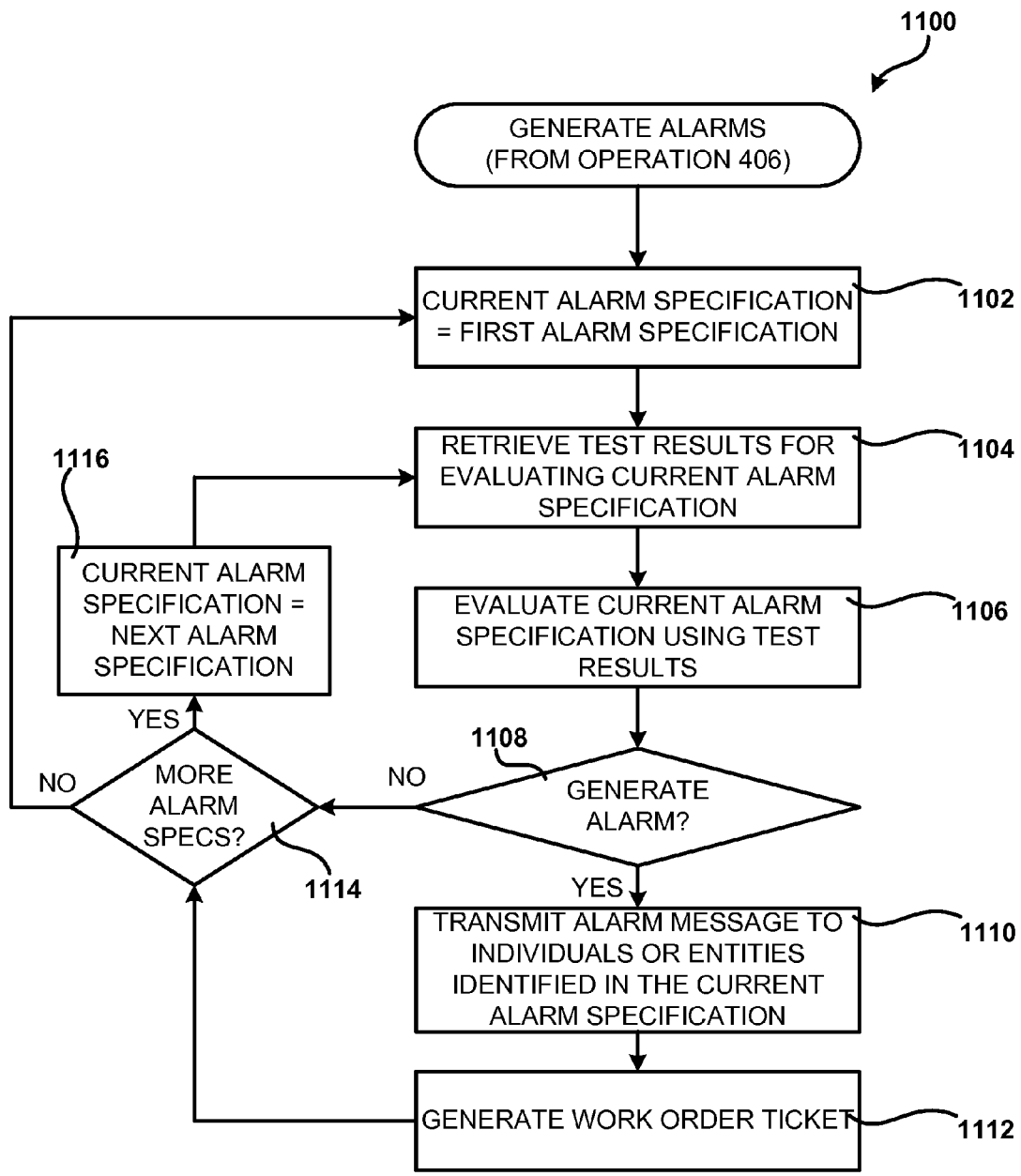
FIG. 11 is a flow diagram showing one illustrative routine for generating alarm messages based upon test results received from API tests in one embodiment disclosed herein.

FIG. 11 is a flow diagram showing one illustrative routine for generating alarm messages 914 based upon test results 702 received from API tests in one embodiment disclosed herein. The routine 1100 begins at operation 1102, where a variable is defined for keeping track of the current alarm specification 910 that is being evaluated by the API testing component 402. The variable is initialized to the first alarm specification 910. Once the variable has been initialized, the routine 1100 proceeds to operation 1104, where the test results 702 needed to evaluate the current alarm specification 910 are retrieved. The test results 702 are then utilized at operation 1106 to evaluate the current alarm specification 910. As mentioned above, each alarm specification 910 defines one or more conditions under which an alarm message 914 should be generated.

From operation 1106, the routine 1100 proceeds to operation 1108, where the API testing component 402 determines whether an alarm message 914 should be generated based upon the evaluation of the alarm specification 910 and the relevant test results 702. If an alarm should be generated, the routine 1100 proceeds to operation 1110, where an alarm message 914 is generated and transmitted to one or more individuals or entities identified in the alarm specification 910. At operation 1112, a work order ticket might also be generated in a work order ticketing system associated with the PES platform 108. From operation 1112, the routine 1100 proceeds to operation 1114.

If, at operation 1108, the API testing component 402 determines that an alarm message 914 should not be generated for the current alarm specification 910, the routine 1100 proceeds from operation 1108 to operation 1114. At operation 1114, the API testing component 402 determines whether additional alarm specifications 910 remain to be evaluated. If so, the routine 1100 proceeds from operation 1114 to operation 1116, where the variable maintaining the identity of the current alarm specification 910 is incremented to the next alarm specification 910.

From operation 1116, the routine 1100 proceeds to operation 1104, where the next alarm specification 910 is evaluated in the manner described above. If no additional alarm specifications 910 remain to be evaluated, the routine 1100 proceeds from operation 1114 to operation 1102, where the process described above is repeated. In this manner, each of the alarm specifications 910 may be continually evaluated in order to generate timely alarm messages 914 to developers or other interested parties.

Figure 12:
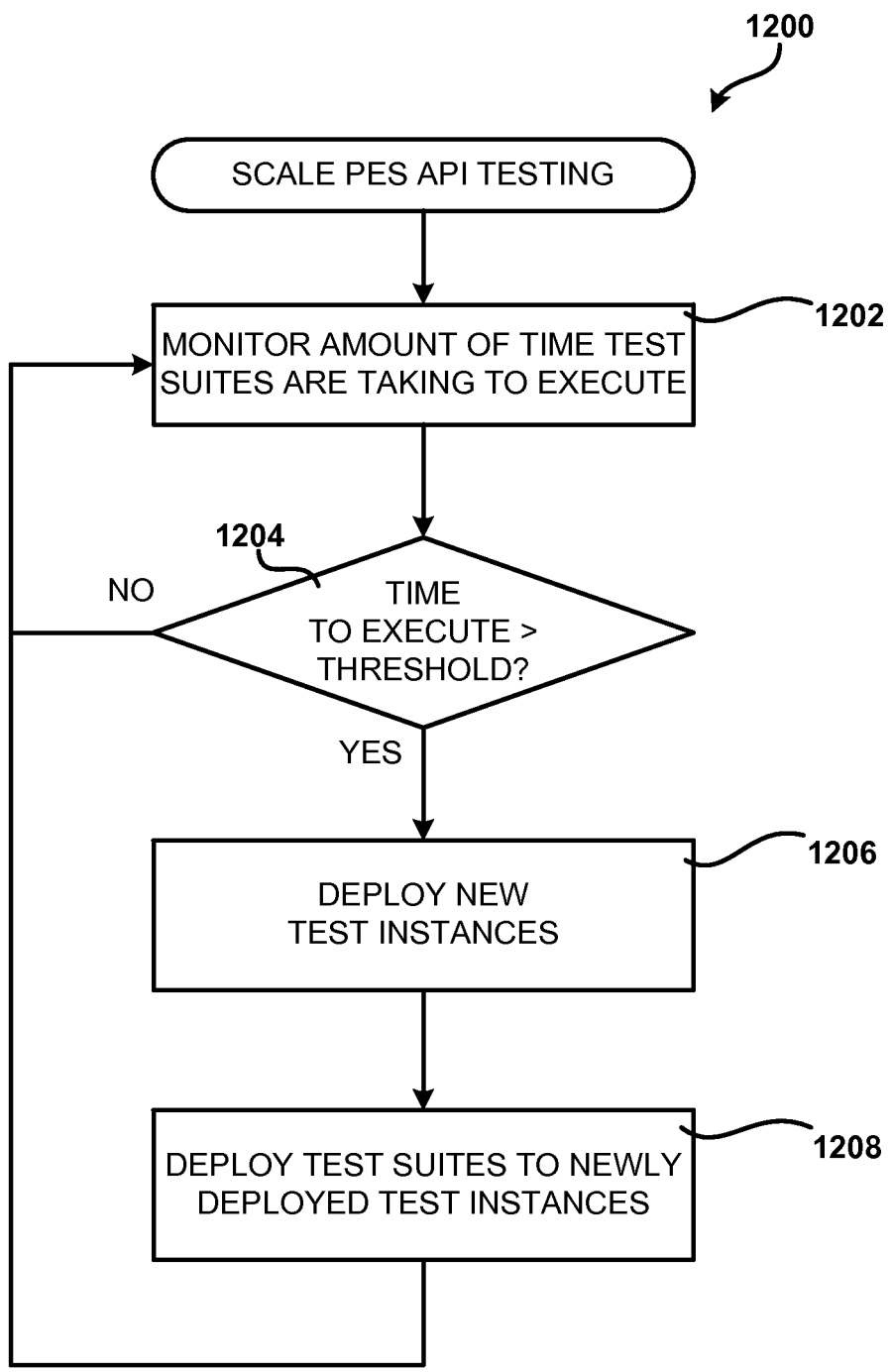
FIG. 12 is a flow diagram showing one illustrative routine for scaling API testing in response to determining that API tests are taking greater than a threshold amount of time to execute, according to one embodiment disclosed herein.

FIG. 12 is a flow diagram showing one illustrative routine for scaling API testing in response to determining that API tests are taking greater than a threshold amount of time to execute, according to one embodiment disclosed herein. As discussed above, the API testing component 402 is configured to scale the number of test virtual machine instances 206 in one embodiment. For example, the API testing component 402 might determine whether the API tests are taking greater than a predetermined amount of time to complete their execution. If so, the API testing component 402 might cause additional test virtual machine instances 206 to be created. The API tests may then be deployed and executed on the additional test machine instances 206. The routine 1200 illustrates this process.

The routine 1200 begins at operation 1202, where the API testing component 402 reviews the test results 702 to determine the amount of time that the API tests are taking to complete their execution. This information might also be reported directly to the API testing component 402 by the API tests or provided to the API testing component 402 in another manner.

From operation 1202, the routine 1200 proceeds to operation 1204, where the API testing component 402 determines whether the API tests are taking longer than a threshold amount of time to execute. An administrator of the PES platform 108 might specify the threshold period of time. If the API tests are completing their execution within the threshold period of time, the routine 1200 continues back to operation 1202. If, however, the API tests are taking longer than the threshold period of time to complete their execution, then the routine 1200 proceeds from operation 1204 to operation 1206.

At operation 1206, the API testing component 402 causes new test instances 206 to be deployed. The API testing component 402 might operate in conjunction with the auto scaling component 212 and/or the deployment component 214 in order to instantiate the new test instances 206. Once the additional test instances 206 have been created, the routine 1200 proceeds to operation 1208, where the API testing component 402 deploys the test suites 406 to the new test instances 206. The API tests in the deployed test suites 406 can then be executed in the manner described above. From operation 1208, the routine 1200 proceeds to operation 1202, where the test instances 206 may continue to be scaled in the manner described above.

It should be appreciated that the number of test instances utilized might be scaled for other reasons and/or in response to other conditions. For example, the number of test instances might be scaled in response to determining that resources used by the test instances are being utilized beyond a specified threshold. In this way, the number of test instances may be scaled in response to high utilization of memory, network bandwidth, storage, or other resources. The number of test instances utilized might also be scaled in order to execute a large number of test suites simultaneously, while also ensuring that all of the test suites can complete their execution within a certain period of time. For example, the number of test instances utilized might be scaled up until all of the test suites can complete their execution and reporting within one minute or other period of time specified by an administrator. The number of test instances might also be scaled in response to other factors or conditions.

Figure 13:
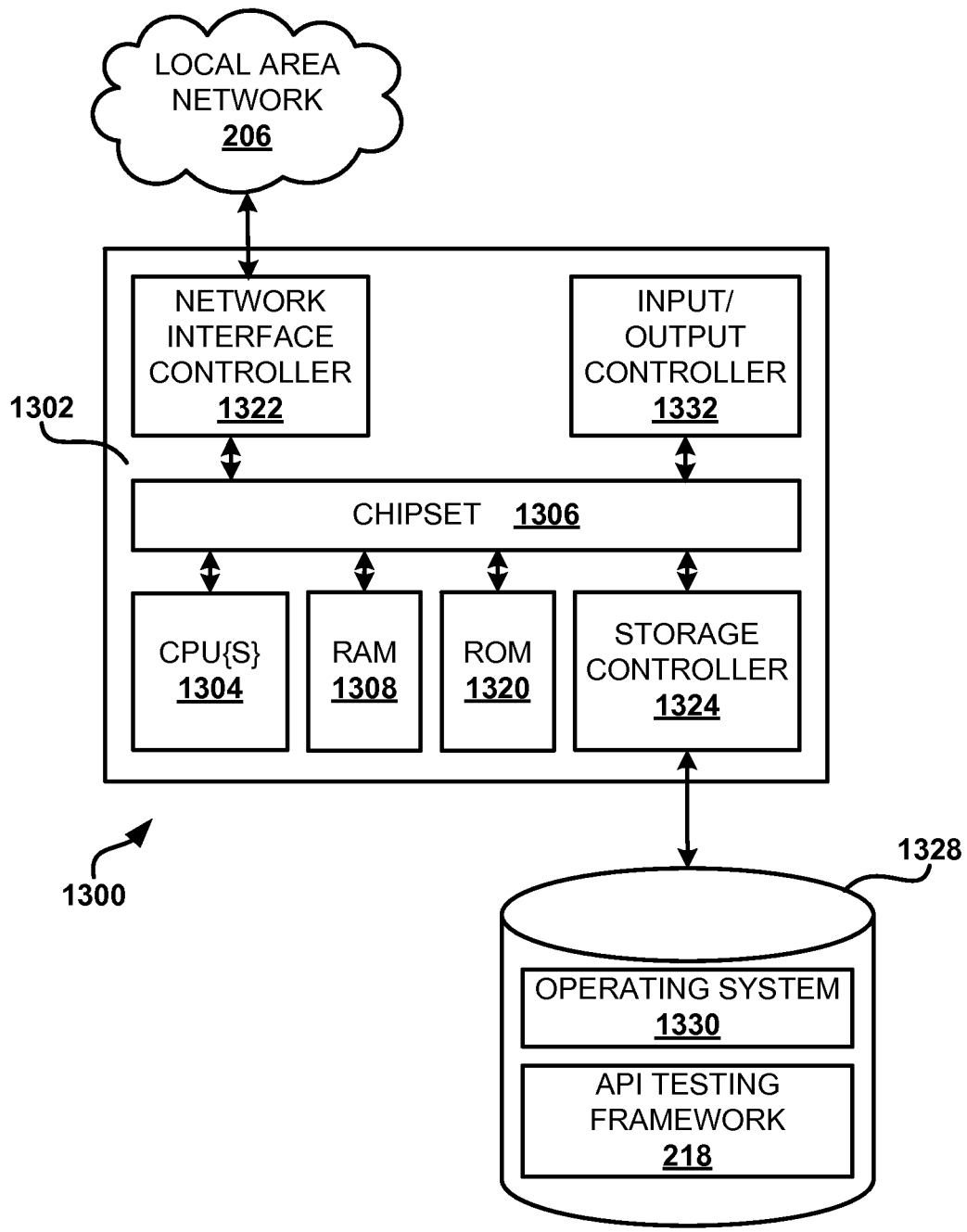
FIG. 13 is a computer architecture diagram showing an illustrative computer hardware architecture for implementing the various computing devices described in embodiments presented herein.

FIG. 13 shows an example computer architecture for a computer 1300 capable of executing the software components described above. The computer architecture shown in FIG. 13 illustrates a conventional server computer, workstation, desktop computer, laptop, network appliance, personal digital assistant ("PDA"), e-reader, digital cellular phone, or other computing device, and may be utilized to execute any aspects of the software components presented herein described as executing within the data centers 102A-102N, on the server computers 202A-202N, on the customer computing system 104, or on any other computing system mentioned herein.

The computer 1300 includes a baseboard, or "motherboard," which is a printed circuit board to which a multitude of components or devices may be connected by way of a system bus or other electrical communication paths. In one illustrative embodiment, one or more central processing units ("CPUs") 1304 operate in conjunction with a chipset 1306. The CPUs 1304 are standard programmable processors that perform arithmetic and logical operations necessary for the operation of the computer 1300.

The CPUs 1304 perform the necessary operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 1306 provides an interface between the CPUs 1304 and the remainder of the components and devices on the baseboard. The chipset 1306 may provide an interface to a random access memory ("RAM") 1308, used as the main memory in the computer 1300. The chipset 1306 may further provide an interface to a computer-readable storage medium such as a read-only memory ("ROM") 1320 or non-volatile RAM ("NVRAM") for storing basic routines that help to startup the computer 1300 and to transfer information between the various components and devices. The ROM 1320 or NVRAM may also store other software components necessary for the operation of the computer 1300 in accordance with the embodiments described herein.

The computer 1300 may operate in a networked environment using logical connections to remote computing devices and computer systems through the network 206. The chipset 1306 may include functionality for providing network connectivity through a network interface controller ("NIC") 1322, such as a gigabit Ethernet adapter. The NIC 1322 is capable of connecting the computer 1300 to other computing devices over the network 206. It should be appreciated that multiple NICs 1322 may be present in the computer 1300, connecting the computer to other types of networks and remote computer systems.

The computer 1300 may be connected to a mass storage device 1328 that provides non-volatile storage for the computer. The mass storage device 1328 may store system programs, application programs, other program modules, and data, which have been described in greater detail herein. The mass storage device 1328 may be connected to the computer 1300 through a storage controller 1324 connected to the chipset 1306. The mass storage device 1328 may consist of one or more physical storage units. The storage controller 1324 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 1300 may store data on the mass storage device 1328 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 1328 is characterized as primary or secondary storage, and the like.

For example, the computer 1300 may store information to the mass storage device 1328 by issuing instructions through the storage controller 1324 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1300 may further read information from the mass storage device 1328 by detecting the physical states or characteristics of one or more particular locations within the physical storage units.

In addition to the mass storage device 1328 described above, the computer 1300 may have access to other computer-readable storage medium to store and retrieve information, such as program modules, data structures, or other data. It should be appreciated by those skilled in the art that computer-readable storage media can be any available media that provides for the storage of non-transitory data and that may be accessed by the computer 1300.

By way of example, and not limitation, computer-readable storage media may include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The mass storage device 1328 may store an operating system 1330 utilized to control the operation of the computer 1300. According to one embodiment, the operating system comprises the LINUX operating system. According to another embodiment, the operating system comprises the WINDOWS® SERVER operating system from MICROSOFT Corporation. According to further embodiments, the operating system may comprise the UNIX or SOLARIS operating systems. It should be appreciated that other operating systems may also be utilized. The mass storage device 1328 may store other system or application programs and data utilized by the computer 1300, such as the API testing framework 218 and/or the other software components described above.

In one embodiment, the mass storage device 1328 or other computer-readable storage media is encoded with computer-executable instructions which, when loaded into the computer 1300, transforms the computer from a general-purpose computing system into a special-purpose computer capable of implementing the embodiments described herein. These computer-executable instructions transform the computer 1300 by specifying how the CPUs 1304 transition between states, as described above. According to one embodiment, the computer 1300 has access to computer-readable storage media storing computer-executable instructions which, when executed by the computer 1300, perform the routine 500 described above with regard to FIG. 5.

The computer 1300 may also include an input/output controller 1332 for receiving and processing input from a number of input devices, such as a keyboard, a mouse, a touchpad, a touch screen, an electronic stylus, or other type of input device. Similarly, the input/output controller 1332 may provide output to a display, such as a computer monitor, a flat-panel display, a digital projector, a printer, a plotter, or other type of output device. It will be appreciated that the computer 1300 may not include all of the components shown in FIG. 13, may include other components that are not explicitly shown in FIG. 13, or may utilize an architecture completely different than that shown in FIG. 13.

Based on the foregoing, it should be appreciated that technologies for testing an API have been presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example embodiments and applications illustrated and described, and without departing from the true spirit and scope of the present invention, which is set forth in the following claims.

What is claimed is:

1. A computer-implemented method for testing an application programming interface (API), the method comprising performing computer-implemented operations for:
   storing one or more test suites in a test suite data store, each of the test suites comprising an API test and associated instructions for executing the API test;
   storing one or more user views in a user view data store, each of the user views comprising a user interface specification defining a visual layout for presenting test results generated by one or more of the test suites and an alarm specification defining one or more conditions under which one or more alarm messages are to be generated based upon the test results; and
   executing an API testing component configured to cause test suites in the test suite data store to be deployed to one or more test virtual machine instances, to cause the API tests to be periodically executed on the test virtual machine instances utilizing the associated instructions for executing the API tests, to collect test results from the execution of the API tests, to store the test results in a test results data store, to provide a user interface for viewing the test results using one of the user interface specifications, and to generate one or more alarm messages using an alarm specification and the test results.

2. The computer-implemented method of claim 1, wherein the API comprises a Web services API for controlling the configuration and execution of one or more virtual machine instances executing on a programmable execution service.

3. The computer-implemented method of claim 1, wherein the test virtual machine instances are executed on server computers executing one or more customer virtual machine instances.

4. The computer-implemented method of claim 1, wherein the API testing component is further configured to:
   periodically access the test suite data store to determine if one or more new test suites have been added to the test suite data store or whether one or more test suites in the test suite data store have been modified; and
   in response to determining that one or more new test suites have been added to the test suite data store or that one or more test suites in the test suite data store have been modified, to cause the new or modified test suites to be deployed to the test virtual machine instances.

5. The computer-implemented method of claim 1, wherein the API testing component is further configured to:
   determine whether a time to execute one or more of the API tests exceeds a threshold amount of time; and
   in response to determining that the time to execute exceeds the threshold amount of time, to create one or more additional test virtual machine instances and to deploy one or more of the test suites to the additional test virtual machine instances.

6. A non-transitory computer-readable storage medium having computer-executable instructions stored thereupon which, when executed by a computer, cause the computer to:
   store one or more API tests used in testing an API used in a programmable execution service that is configured to execute one or more virtual machine instances and associated instructions for executing each API test;
   store one or more user views comprising a user interface specification defining a visual layout for presenting test results generated by one or more of the API tests;
   deploy the API tests to one or more test virtual machine instances;
   cause the API tests to be periodically executed on the test virtual machine instances using the instructions associated with that API test;
   receive the test results from one or more of the API tests; and to utilize the user interface specification associated with one of the user views to provide a user interface for viewing the test results from one or more of the API tests.

7. The non-transitory computer-readable storage medium of claim 6, wherein the user views further comprise an alarm specification defining one or more conditions under which one or more alarm messages are to be generated based upon the test results.

8. The non-transitory computer-readable storage medium of claim 7, having further computer-executable instructions stored thereupon which, when executed by the computer, cause the computer to utilize the test results and an alarm specification associated with one of the user views to generate one or more alarm messages.

9. The non-transitory computer-readable storage medium of claim 6, wherein one or more of the API tests are deployed to the one or more test virtual machine instances in response to detecting that new API tests have been added to a test suite data store.

10. The non-transitory computer-readable storage medium of claim 6, wherein one or more of the API tests are deployed to the one or more test virtual machine instances in response to detecting that one or more test suites in a test suite data store have been modified.

11. The non-transitory computer-readable storage medium of claim 6, wherein the API tests comprise executable program code for testing the operation of a Web services API for controlling the configuration and execution of one or more virtual machine instances executing on the programmable execution service.

12. The non-transitory computer-readable storage medium of claim 6, wherein the test virtual machine instances are executing on one or more server computers that are also executing one or more customer virtual machine instances.

13. The non-transitory computer-readable storage medium of claim 6, having further computer-executable instructions stored thereupon which, when executed by the computer, cause the computer to:
   determine whether one or more of the API tests is taking more than a threshold amount of time to execute; and
   create one or more additional test virtual machine instances and deploy one or more of the test suites to the additional test virtual machine instances in response to determining that one or more of the API tests is taking more than a threshold amount of time to execute.

14. A computing system for testing the operation of an application programming interface (API), the computing system comprising:
   a first computer executing one or more test virtual machine instances;
   a test suite data store storing one or more API tests that comprise executable components for testing the API for a programmable execution service that is configured to execute one or more virtual machine instances;
   a user view data store storing one or more user views; and
   a second computer configured to cause one or more of the API tests to be periodically executed on one or more of the test virtual machine instances, to receive test results from the API tests, and to provide a user interface for viewing the test results using the one or more user views.

15. The system of claim 14, wherein the API comprises a Web services API for controlling the configuration and execution of one or more virtual machine instances executing on the programmable execution service.

16. The system of claim 14, wherein each API test has execution instructions associated therewith utilized to execute that API test on the test virtual machine instances.

17. The system of claim 14, wherein the second computer is further configured to cause one or more additional test virtual machine instances to be created for executing the API tests in response to determining that one or more resources used by the test instances are being utilized beyond a specified threshold.

18. The system of claim 14, wherein each of the user views comprises a user interface specification defining a visual layout for use in presenting test results generated by one or more of the API tests, and wherein a user interface specification is utilized to provide the user interface for viewing the test results.

19. The system of claim 18, wherein the user views further comprise an alarm specification defining one or more conditions under which one or more alarm messages are to be generated based upon the test results, and wherein the second computer is configured to generate one or more alarm messages using an alarm specification and the test results.

20. The system of claim 14, wherein the second computer is further configured to:
   determine if one of the test virtual machine instances has become unresponsive; and
   in response to determining that one of the test virtual machine instances has become unresponsive, to terminate the unresponsive test virtual machine instance and to cause a new test virtual machine instance to be instantiated.

* * * * *